(12) United States Patent
Yoshino et al.

(10) Patent No.: US 7,894,132 B2
(45) Date of Patent: Feb. 22, 2011

(54) SCREEN

(75) Inventors: Yasunori Yoshino, Matsumoto (JP);
Shinobu Shiohara, Azumino (JP);
Masato Maruyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 233 days.

(21) Appl. No.: 12/208,243

(22) Filed: Sep. 10, 2008

(65) Prior Publication Data

US 2009/0067045 A1 Mar. 12, 2009

(30) Foreign Application Priority Data

Sep. 11, 2007 (JP) ................. 2007-235672

(51) Int. Cl.
*G03B 21/56* (2006.01)
(52) U.S. Cl. ..................... 359/443; 359/461
(58) Field of Classification Search ............. 359/443, 359/461
See application file for complete search history.

(56) References Cited

U.S. PATENT DOCUMENTS

| 3,087,535 | A | 4/1963 | Muller |
| 2007/0121209 | A1* | 5/2007 | Liang et al. .......... 359/461 |
| 2010/0007950 | A1* | 1/2010 | Yuzawa .............. 359/461 |

FOREIGN PATENT DOCUMENTS

| EP | 1173047 A | 1/2002 |
| GB | 779722 A | 7/1957 |
| GB | 941198 A | 11/1963 |
| GB | 2076179 A | * 11/1981 |
| JP | 33-014669 Y | 9/1958 |
| JP | 39-020386 Y | 7/1964 |
| JP | 39-023395 Y | 8/1964 |
| JP | 40-028834 B | 12/1965 |
| JP | 02-088099 U | 7/1990 |
| JP | 07-021997 Y | 1/1995 |
| JP | 11-142974 | 5/1999 |
| JP | 2006-072291 A | 3/2006 |

OTHER PUBLICATIONS

European Patent Search Report, Dec. 23, 2008, issued in related Patent Application No. EP-08015765.4.

* cited by examiner

*Primary Examiner*—Christopher Mahoney
(74) *Attorney, Agent, or Firm*—AdvantEdge Law Group, LLC

(57) ABSTRACT

A screen onto which an image light may be projected includes a flexible screen body, a first and a second storage member, and a retention member. The first storage member includes a screen wind-up section that winds up the screen body and supports either one of opposing end portions of the screen body and a base body that supports the screen wind-up section. The retention member includes a substantially orthogonal column that extends along the screen body and a pair of arm members that couple the column and the first and second storage members together. One end of each of the arm members is respectively rotatably coupled to the first and second storage members and another end of each of the arm members is rotatably coupled to the column.

6 Claims, 13 Drawing Sheets

SCREEN

CROSS REFERENCE TO RELATED APPLICATIONS

The present application claims priority and incorporates herein by reference in its entirety Japanese Patent Application No. 2007-235672 filed Sep. 11, 2007.

BACKGROUND

Various types of screen with a sheet-like flexible screen body have been proposed within the industry. Typically, image lights are magnified and projected from a projector or others onto a screen projection surface of the screen body as referred to in Japanese Patent No. JP-A-11-142974.

The screen disclosed in the Japanese Patent No. JP-A-11-142974 is a transportable screen whose body is wound up when stored and is pulled out to form a projection surface when the screen is in use. More specifically, the transportable-type screen disclosed in the Japanese Patent No. JP-A-11-142974 is configured to include first and second frames, a spring roll, and extension means. The spring roll is attached to the first frame for taking up the screen body. The second frame is fixedly attached with an end of the screen body, and the extension means biases both the first and second frames in a direction of moving the frames away from each other. The extension means is configured to include first to fourth rails, and an elastic member. The first and fourth rails extend parallel to each other, and their one ends are respectively attached pivotally to the first and second frames. The second and third rails also extend parallel to each other, and their one ends are each pivotally attached to the first rail, and their other ends are each pivotally attached to the fourth rail. The elastic member is latched by, at one end, the pivotally-attached portions of the first and third rails, and the other end is latched by the pivotally-attached portions of the second and fourth rails.

For using the screen, a user applies a force in a direction of moving the first and second frames away from each other so that the extension means is extended, and the screen body is pulled out from the spring roll. When the screen is not in use, the user applies a force in a direction of moving the first and second frames close to each other so that the extension means is folded, and the screen body is wound up by the spring roll. That is, the extension means has a function of guiding the first and second frames to be close to or away from each other.

Among other things, one problem with such a transportable screen as disclosed in the Japanese Patent No. JP-A-11-142974 is that the configuration of the extension means is complicated and not easy to be simplified as it is configured by the four rails and the elastic member.

SUMMARY

Various embodiments provide a screen that is simple in configuration and has good usability.

One embodiment of the disclosure is directed to a screen that includes a flexible screen body, a first and a second storage member, and a retention member. The screen body is configured to include a projection surface and/or screen onto which an image light is projected. The first storage member including a screen wind-up section that supports either one of opposing end portions of the screen body and winds up the screen body. The first storage member also includes a base body that supports the screen wind-up section. The second storage member supports the other end portion of the screen body. The retention member holds both the first and second storage members. In the screen, the retention member includes a column that is substantially orthogonal in a direction where the first and second storage members are opposing each other and extends along the screen body. The retention member also includes a pair of arm members that couple together the column and the first and second storage members, and one end of each of the arm members are respectively coupled to the first and second storage members to be able to rotate, and the other end of each of the arm members are coupled to the column to be able to rotate.

In this configuration, the screen wind-up section may be provided only to the first storage member, or may be provided to both the first and second storage members.

In one embodiment, the screen is provided with the column, a pair of arm members, and the retention member for holding the first and second storage members. In the arm members, their one ends are respectively coupled to the first and second storage members to be able to rotate, and the other ends are coupled to the column to be able to rotate. With such a configuration, in the state that the first and second storage members are positioned close to each other, and in the state that the screen body is wound up by the screen wind-up section (in the below, referred to as state of storage), the arm members can be so set that their one ends are positioned close to each other, and can be so set as to be substantially parallel to a pillar-like shaft of the column. In the state of storage, rotating the arm members with respect to the column in such a manner that their one ends are moved away from each other can make a state change, i.e., to a state of being able to display images on a projection surface (hereinafter, referred to as state of projection surface formation). That is, by rotating the arm members as such, the first and second storage members connected at the respective one ends of the arm members are moved away from each other while remaining parallel to each other, and the screen body is then pulled out from the screen wind-up section so that the projection surface is formed. Similarly, in the state of projection surface formation, rotating the arm members with respect to the column in such a manner that their one ends are moved close to each other can lead to another state change, i.e., to the state of storage. That is, by rotating the arm members as such, the first and second storage members connected at the respective one ends of the arm members are moved close to each other while remaining parallel to each other so that the state is changed to be ready for storage.

As such, only by rotating the arm members with respect to the column, the state of the screen can be changed between the state of storage and the state of projection surface formation, thereby implementing the configuration with good usability. Moreover, compared with the previous configuration, only the column and a pair of arm members can move the first and second storage members close to or away from each other, thereby implementing the simple configuration.

In one embodiment of the screen of the disclosure, the retention member includes: a moving member that moves along the column; and a pair of coupling members whose one ends are coupled to the moving member to be able to rotate, and whose other ends are respectively coupled to the arm members to be able to rotate.

In one embodiment of the screen of the disclosure, the retention member is provided with the moving member and a pair of coupling members. The coupling members serve to move the moving member along the column in response to the rotation of the arm members with respect to the column. In this configuration, because a pair of coupling members respectively coupled to a pair of arm members are both coupled to the same moving member, for a state setting of either storage or projection surface formation, by the workings of the coupling members and the moving member, rotating one of the arm members with respect to the column can rotate also the remaining arm member with respect to the column. Accordingly, the above-described effects of being able to implement the configuration with good usability can be achieved in a suitable manner.

In one embodiment of the screen of the disclosure, the retention member includes a biasing member that is connected to the moving member and the column, and biases the moving member in a direction along which the moving member is moved when the arm members are rotated with respect to the column in such a manner that the one ends of the arm members are brought closer to each other.

In one embodiment of the screen of the disclosure, the retention member is provided with the biasing member that biases the moving member in the above-described direction. With the biasing member provided as such, for a state setting of the screen from projection surface formation to storage, a user does not need that much of a force to rotate the arm members but the biasing force of the biasing member will do with respect to the column in such a manner that one ends of the arm members are moved close to each other. As an alternative configuration, the first and second storage members may respectively support end portions of the screen body in the lateral direction, and in the state of storage, one ends of the arm members may be located on the upper side. In this configuration, for a state setting of the screen from storage to projection surface formation, the biasing force of the biasing member can prevent the arm members from abruptly rotating due to the self weight of the components, i.e., the first and second storage members and the arm members, thereby helping a user to rotate smoothly the arm members. Accordingly, the above-described effects of being able to implement the configuration with good usability can be achieved in a suitable manner.

In one embodiment of the screen of the disclosure, the arm members each include: a tubular member that extends in a predetermined direction; and an insertion member that is formed like a pillar extending in the predetermined direction, and is inserted into the tubular member to be able to freely move in the direction along which the tubular member is extended.

In one embodiment of the screen of the disclosure, the arm members are each provided with the tubular member and the insertion member, and the insertion member is allowed to freely move toward/from the tubular member. With such a configuration, in the state of projection surface formation, by moving the insertion member toward/from the tubular member, the space dimension can be changed between the first and second storage members, thereby changing as appropriate the aspect ratio of the screen body, i.e., projection surface, in accordance with the aspect ratio of images to be projected.

Moreover, in the state of storage, moving the insertion member toward the inside of the tubular member will reduce the size of the screen, and thus the resulting screen can be carried around with ease.

In one embodiment of the screen of the disclosure, the first and second storage members respectively support end portions orthogonal to the horizontal direction of the screen body, and when the first and second storage members are positioned close to each other, the one ends of the arm members are located on an upper side.

In one embodiment of the screen of the disclosure, the first and second storage members respectively support the end portions of the screen body in the lateral direction. In the state that the first and second storage members are close to each other, i.e., state of storage, one ends of the arm members are both positioned on the upper side. With such a configuration, for a state setting of the screen from storage to projection surface formation, utilizing the self weight of the components, i.e., the screen body, the first and second storage members, and the arm members, a user does not need that much of a force to rotate the arm members with respect to the column in such a manner that one ends of the arm members are moved away from each other. Accordingly, the above-described effects of being able to implement the configuration with good usability can be achieved in a suitable manner.

Various embodiments of the screen provide a support leg including a plurality of leg sections abutting a placement surface where the screen is disposed, and supporting the screen in its entirety through connection to the column. The support leg is detachably attached to the column.

One embodiment of the screen of the disclosure may be provided with the support leg including a plurality of leg sections. This configuration enables the screen to remain stably positioned by the leg sections each abutting the placement surface.

Moreover, the support leg is configured to be attachable/detachable to/from the column. As such, when the screen is not in use, removing the support leg from the column can reduce the entire length of the screen so that the screen can be carried around with ease.

In one embodiment of the screen, the support leg includes a support leg body shaped substantially like a pillar with an attachment/detachment section allowing detachable attachment to the column, one end of each of the leg sections abutting the placement surface are attached to be close to or away from a pillar-like shaft of the support leg body, and the other end of each of the leg sections are attached to the support leg body to be able to rotate, and a binding member is provided for, when the support leg is removed from the column for storage of the screen, binding together as a piece the column and the support leg body stacked one on the other.

In one embodiment of the screen of the disclosure, the support leg is provided with the support leg body shaped substantially like a pillar, and one end of each of the leg sections are attached to be close to or away from the pillar-like shaft of the support leg body, and the other end of each of the leg sections are attached to the support leg body to be able to rotate. With such a configuration, for using the screen, the support leg is set in a leg-open state in which one ends of the leg sections are all away from the pillar-like shaft of the support leg body, and when the screen is not in use, the support leg is set in a leg-closed state in which one ends of the leg sections are all close to the pillar-like shaft of the support leg body. Moreover, the screen is provided with the binding member. Therefore, when the screen is not in use, the column and the support leg body are bound as a piece by the binding member when the first and second storage members are set in the state of storage, i.e., close to each other, and when the support leg is set in the leg-closed state. Accordingly, the screen can be reduced in size when it is not in use, and the resulting screen can be carried around with ease.

BRIEF DESCRIPTION OF THE DRAWINGS

Embodiments of the disclosure are described with reference to the accompanying drawings, wherein like reference numbers designate like elements.

DESCRIPTION OF EMBODIMENTS

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

Embodiments according to the disclosure are described by referring to the accompanying drawings. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment.

Schematic Configuration of Screen

Figure 1:
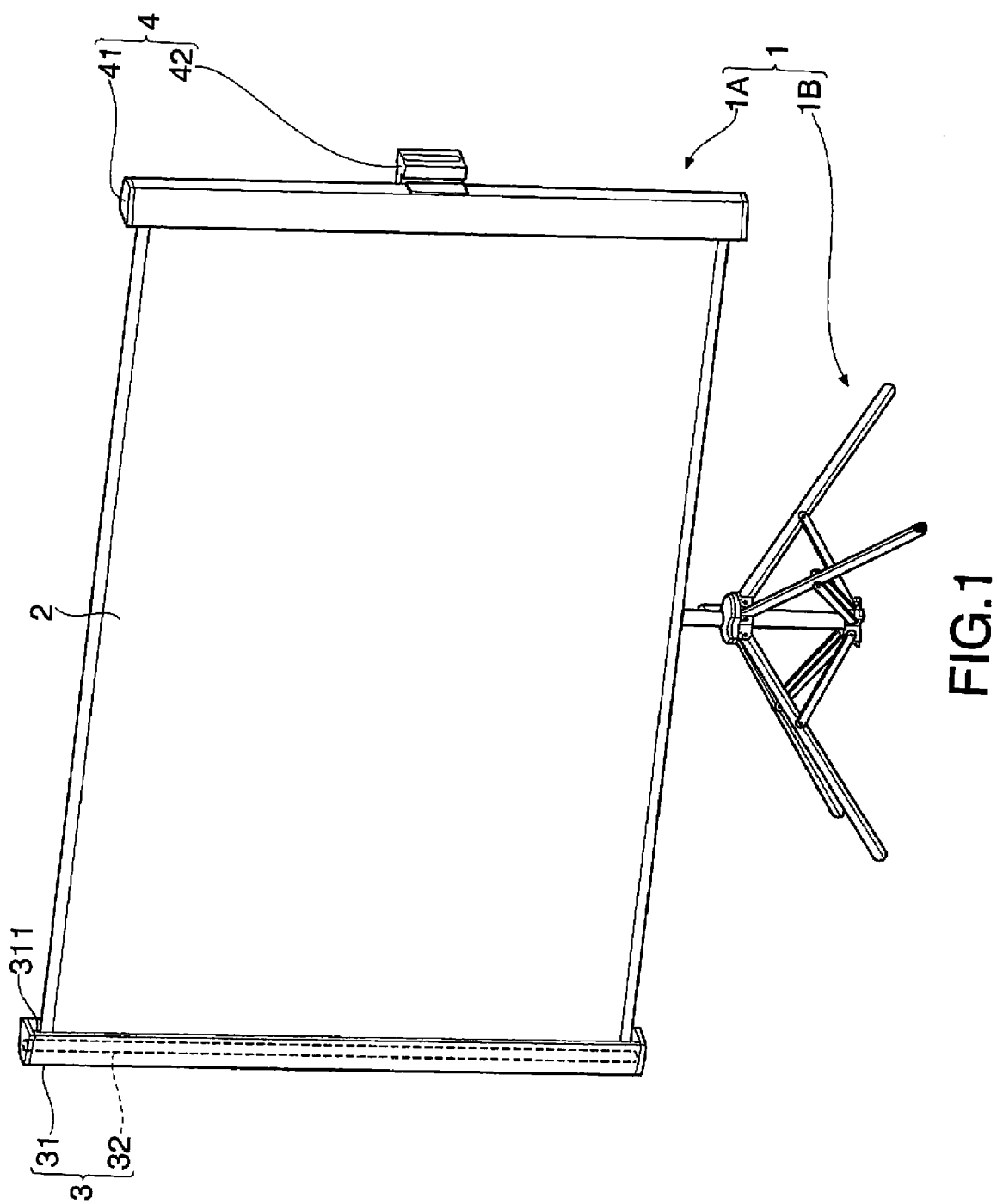
FIG. 1 is a perspective view of a screen of an embodiment, showing the schematic configuration thereof.
Figure 2:
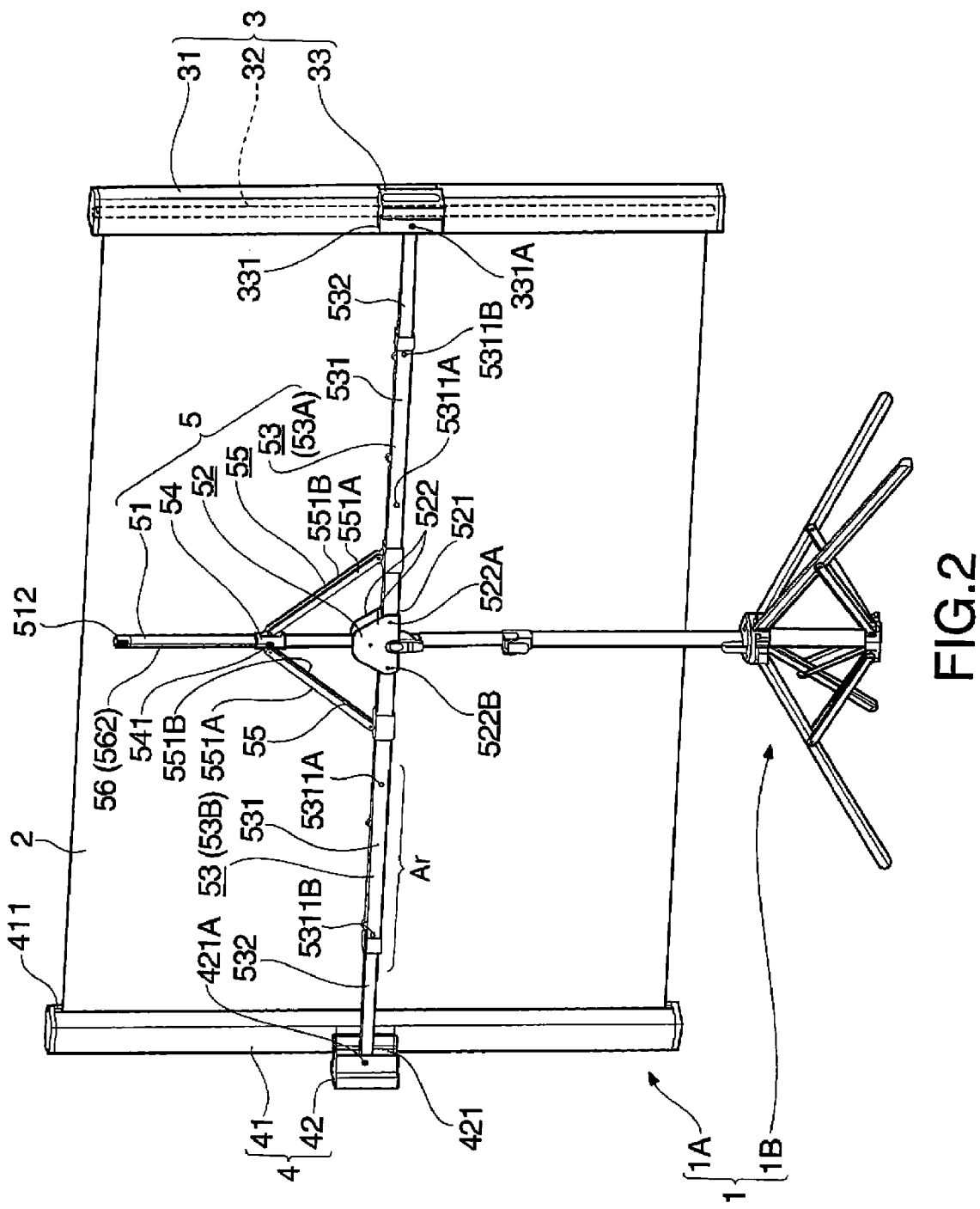
FIG. 2 is another perspective view of the screen of the embodiment, showing the schematic configuration thereof.

FIGS. 1 and 2 are each a perspective view of a screen 1, showing the schematic configuration thereof. Specifically, FIG. 1 is a perspective view of the screen 1, viewed from the front surface side thereof from which an image light enters. FIG. 2 is a perspective view of the screen 1, viewed from the rear surface side thereof.

Note that the expressions of "right" and "left" in the below denote the right and left sides of the screen 1 when viewed from the rear surface side thereof.

Onto the screen 1, an image light as a result of magnification projection from a projector or others is directed, for example. As shown in FIG. 1 or 2, this screen 1 is mainly configured to include an image projection section 1A, a support leg 1B, and a binding member 1C (refer to FIG. 13).

Configuration of Image Projection Section

The image projection section 1A is a part where an image light is projected, and as shown in FIG. 1 or 2, is configured to include a screen body 2, a first storage member 3, a second storage member 4, and a retention member 5 (FIG. 2).

The screen body 2 is formed like a sheet with flexibility, and is of a reflection type with which an image light entered to the front side surface thereof is reflected for display.

The first storage member 3 is a portion extending along one of end portions orthogonal to the horizontal direction of the rectangular-shaped screen body 2, i.e., a right end portion, and supporting the right end portion of the screen body 2. As shown in FIG. 1 or 2, the first storage member 3 is configured to include a base body 31, a spring roll 32 serving as a screen wind-up section, a first grip section 33 (FIG. 2), and others.

The base body 31 is a chassis shaped substantially like a rectangular parallelepiped extending in the vertical direction, and houses therein the spring roll 32 to be able to rotate.

In such a base body 31, as shown in FIG. 1, the left end surface is formed with an insertion hole 311 for insertion of the screen body 2 to go therethrough.

The spring roll 32 is a member that is configured to be able to rotate about a rotation axis, i.e., the vertical direction of the screen body 2, and winds up the screen body 2. Although not shown specifically, this spring roll 32 is biased by a spring in the direction of taking up the screen body 2, and works to automatically wind up the screen body 2 when the force of pulling out the screen body 2 is reduced.

As shown in FIG. 2, the first grip section 33 is attached to the rear end surface of the base body 31 at substantially the center portion in the vertical direction, and is gripped by a user to move the first storage member 3.

As shown in FIG. 2, this first grip section 33 is formed with a groove section 331 on the side opposing the second storage member 4. This groove section 331 extends from the upper to lower end portions.

The second storage member 4 is a portion extending along the left end portion of the screen body 2, and supporting the left end portion of the screen body 2. As shown in FIG. 1 or 2, this second storage member 4 is configured to include a base body 41, a second grip section 42, and others.

As shown in FIG. 1 or 2, the base body 41 is shaped similar to the base body 31, and supports therein the left end portion of the screen body 2 via an insertion hole 411 (FIG. 2) formed to the right side surface thereof.

As shown in FIG. 1 or 2, the second grip section 42 is shaped similar to the first grip section 33, and is attached to the rear end surface of the base body 41 at substantially the center portion in the vertical direction. The second grip section 42 is a portion where a user grips to move the second storage member 4.

As shown in FIG. 2, this second grip section 42 is formed with a groove section 421 on the side opposing the first storage member 3. The groove section 421 extends from the upper to lower end portions.

The retention member 5 serves to hold both the first and second storage members 3 and 4. As shown in FIG. 2, this retention member 5 is configured to include a column 51, a joint section 52, a pair of arm members 53, a moving member 54, a pair of coupling members 55, a biasing member 56, and others.

As shown in FIG. 2, the column 51 is a substantially cylindrical tube member substantially orthogonal in a horizontal direction where the first and second storage members 3 and 4 are opposing, and extends along the screen body 2 in the vertical direction.

This column 51 is shaped with a width difference, i.e., the lower-side portion thereof is formed larger in diameter than the upper-side portion thereof, and a width-difference section 511 (refer to FIGS. 4 and 5) is provided at substantially the center portion in the vertical direction.

The column 51 is formed with, on its upper end side, a through hole 512 (FIGS. 2, 4, and 5) for insertion of the biasing member 56 to go therethrough, i.e., wire 562 that will be described later. The through hole 512 is formed therein with a pulley 57 for reducing the resistance of the wire 562.

Figure 4:
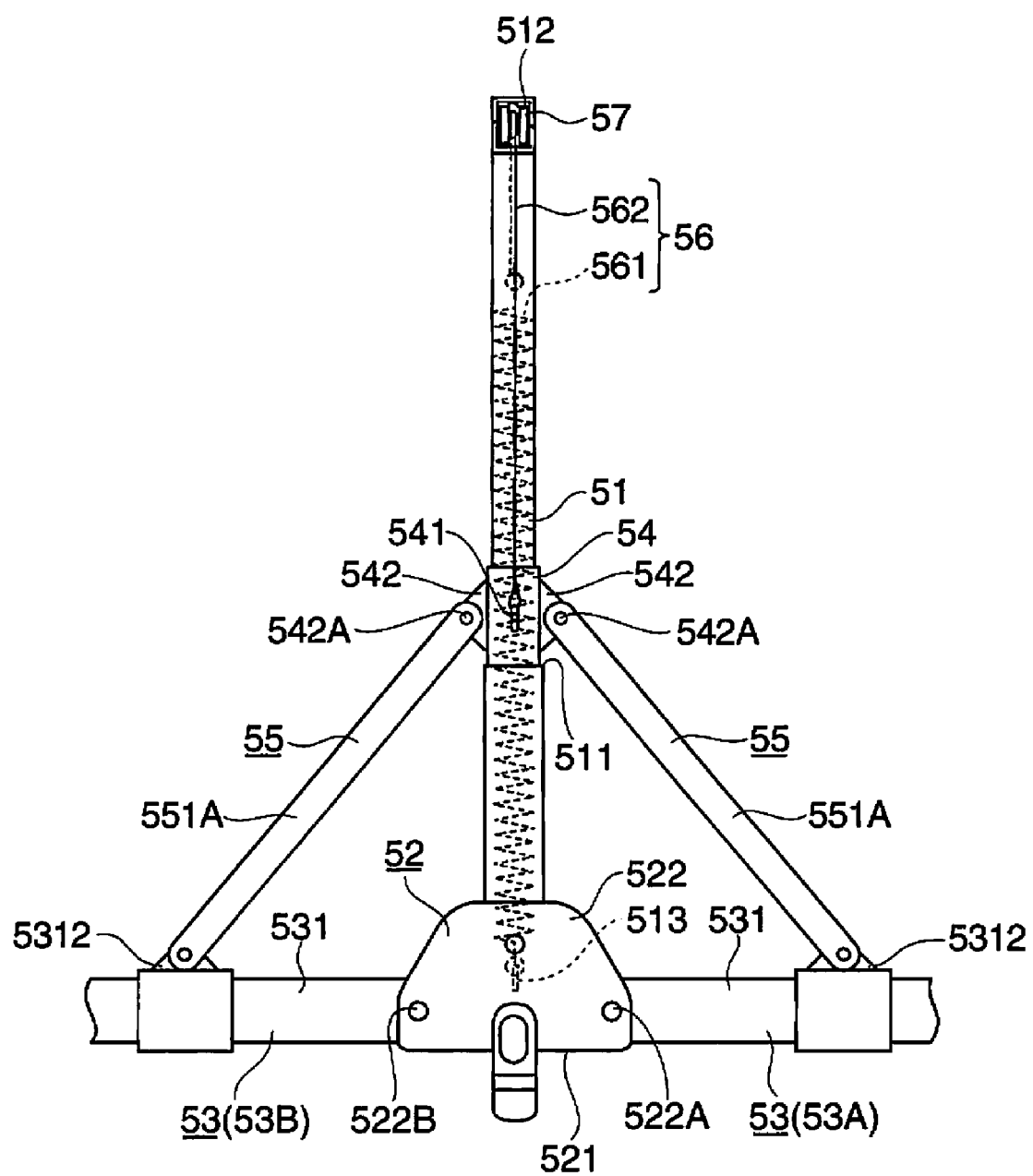
FIG. 4 is a diagram showing the configuration of a moving member, that of a pair of coupling members, and that of a biasing member in the embodiment.
Figure 5:
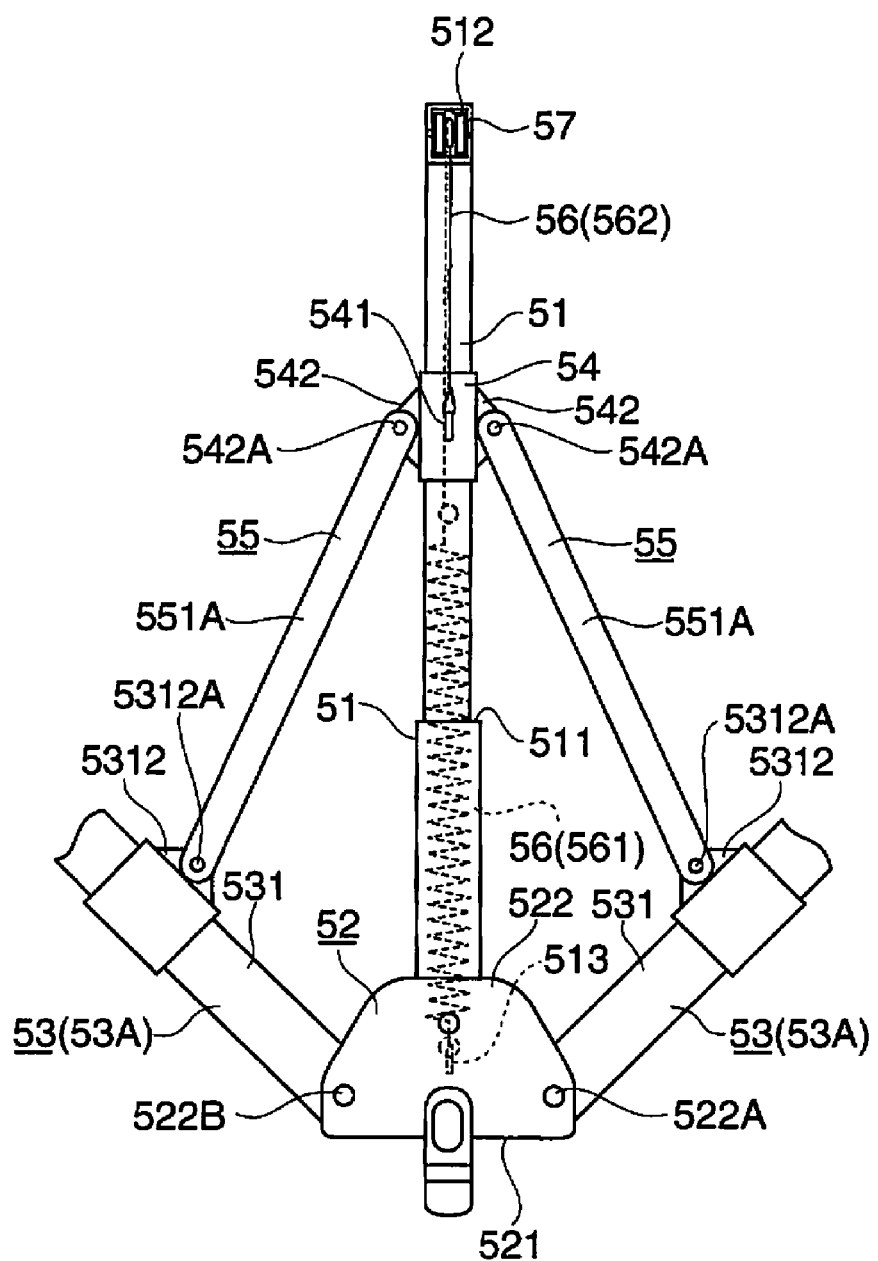
FIG. 5 is another diagram showing the configuration of the moving member, that of a pair of coupling members, and that of the biasing member in the embodiment.

The column 51 is also formed with, on the inner peripheral surface on the lower end side, a first biasing member attachment section 513 (refer to FIGS. 4 and 5). The first biasing member attachment section 513 protrudes toward the inside of the column 51, and is attached with one end of the biasing member 56, i.e., biasing member body 561 that will be described later.

The joint section 52 serves to couple together the column 51 and the arm members 53. As shown in FIG. 2, this joint section 52 is a single-piece configuration including a base section 521 and a pair of protrusion sections 522.

The base section 521 is shaped like a rectangular plate being substantially parallel to the horizontal surface.

The protrusion sections 522 are each shaped like a plate protruding upward from end edges of the base section 521 intersecting in the direction substantially orthogonal to the screen body 2.

Although not shown specifically, in the state that the column 51 is inserted to go through a hole formed at substantially the center portion of the base section 521, the joint section 52 is fixed to the column 51 using a screw or others via the protrusion sections 522.

The joint section 52 is attached with one end of each of the arm members 53 via rotation shafts 522A and 522B (FIGS. 2, 4, and 5) in such a manner that the arm members 53 are symmetrically positioned around the column 51. The rotation shafts 522A and 522B are each substantially orthogonal to the screen body 2 via the protrusion sections 522. That is, one end of each of the arm members 53 are pivotally supported to be able to freely rotate about the rotation shafts 522A and 522B with respect to the joint section 52, i.e., column 51.

Figure 3A:
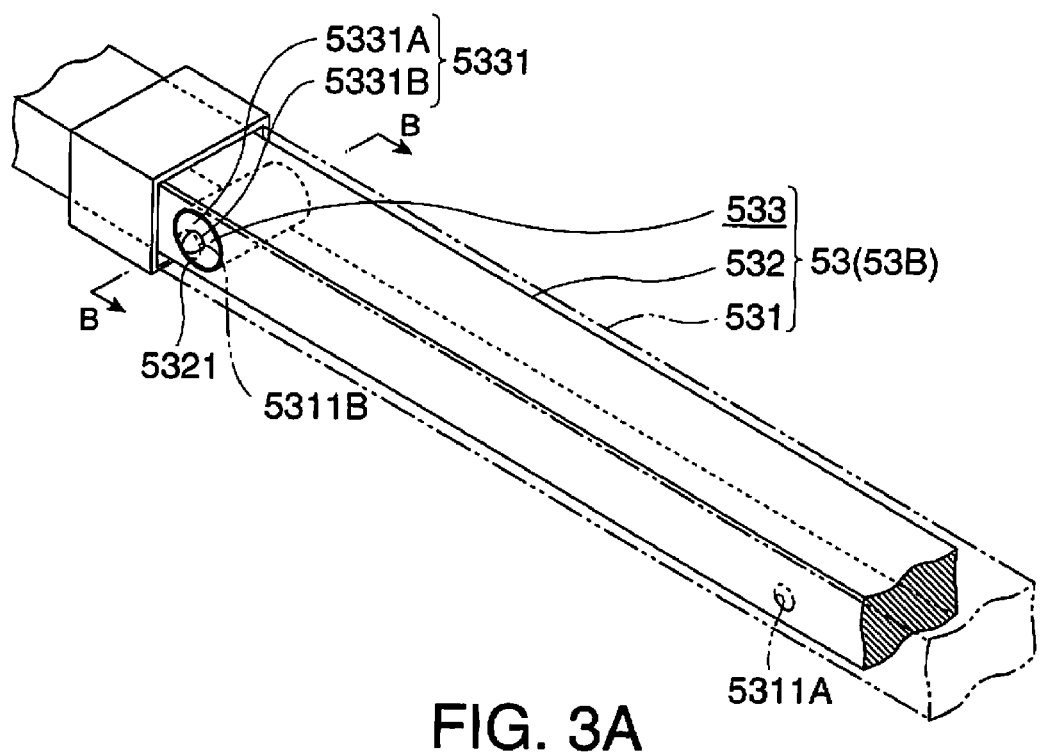
FIGS. 3A and 3B are each a diagram showing the configuration of an arm member in the embodiment.
Figure 3B:
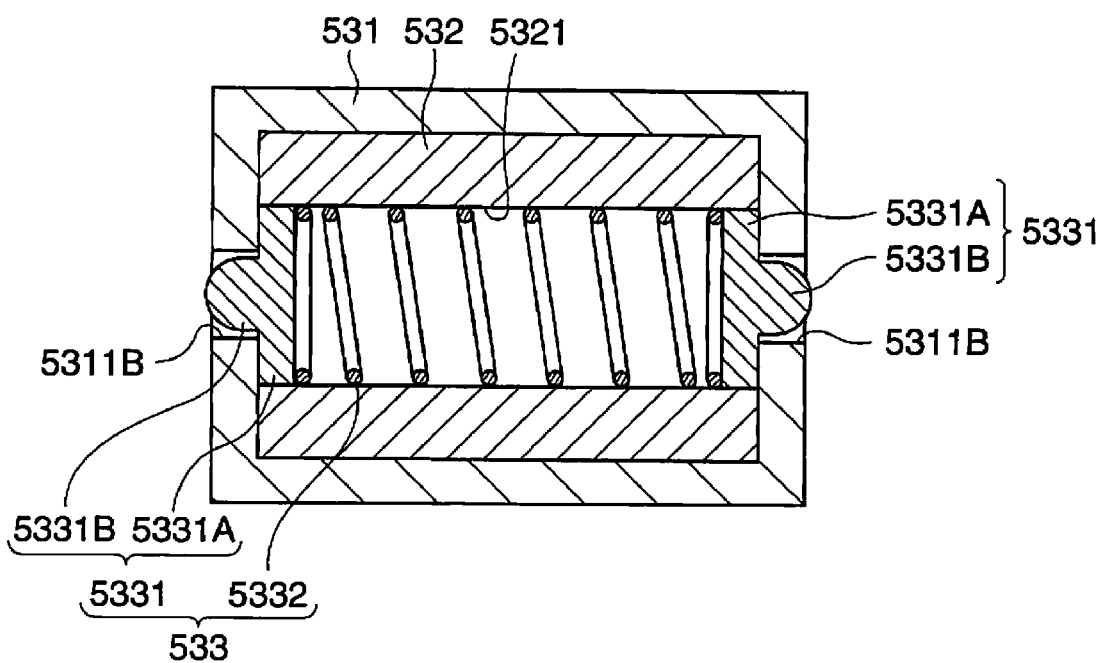

FIGS. 3A and 3B are each a diagram showing the configuration of the arm member 53. Specifically, FIG. 3A shows a part of Ar in FIG. 2. In FIG. 3A, for convenience, a first arm section 531 is partially indicated by chain double-dashed lines, and a second arm section 532 disposed in the first arm section 531 is indicated by solid lines. FIG. 3B is a cross-sectional view of the arm member 53 cut along a line B-B of FIG. 3A.

As shown in FIG. 2, the arm members 53 each serve to couple together the column 51, i.e., joint section 52, and the first and second storage members 3 and 4.

In the below, for convenience, the arm member disposed on the right side is referred to as right-side arm member 53A, and the arm member disposed on the left side is referred to as left-side arm member 53B.

The arm members 53 share the same configuration, and thus described below is only one of the arm members 53.

As shown in FIG. 2 or FIGS. 3A and 3B, the arm member 53 is configured to include the first and second arm sections 531 and 532, a latch member 533 (FIGS. 3A and 3B), and others. The first arm section 531 serves as a tubular member, and the second arm section 532 serves as an insertion section.

As shown in FIG. 2, the first arm section 531 is configured by a tubular member extending in a predetermined direction and being substantially rectangular in cross section. One end of the first arm section 531 is pivotally supported by the joint section 52, i.e., column 51, to be able to freely rotate about the rotation shafts 522A and 522B.

As shown in FIG. 2 or FIGS. 3A and 3B, in the first arm section 531, end surfaces intersecting in the direction substantially orthogonal to the screen body 2 are respectively formed with two latch holes 5311A and 5311B with a predetermined space therebetween in the direction along which the first arm section 531 is extended.

Also in the first arm section 531, on the side of the upper end surface proximal to the coupling portion with the joint section 52, a protrusion section 5312 (refer to FIGS. 4 and 5) is formed by protruding upward.

As shown in FIG. 2 or FIGS. 3A and 3B, the second arm section 532 is shaped like a prism, and one end side thereof is inserted into the first arm section 531 from the other end side of the first arm section 531, i.e., the end not pivotally supported by the joint section 52. As such, the second arm section 532 is allowed to freely move in the direction along which the first arm section 531 is extended. The other end of the second arm section 532 is coupled to the first storage member 3 (second storage member 4) to be able to rotate about a shaft substantially orthogonal to the screen body 2.

To be specific, as shown in FIG. 2, in the second arm section 532 of the right-side arm member 53A, the other end is inserted into the groove section 331 of the first grip section 33, and then is attached to the first storage member 3 via a rotation shaft 331A substantially orthogonal to the screen body 2. That is, the other end of the right-side arm member 53A is pivotally supported about the rotation shaft 331A to be able to freely rotate with respect to the first storage member 3.

Similarly to the right-side arm member 53A, in the second arm section 532 of the left-side arm member 53B, the other end is inserted into the groove section 421 of the second grip section 42, and is then attached to the second storage member 4 via a rotation shaft 421A.

As shown in FIGS. 3A and 3B, this second arm section 532 is formed with a latch member storage section 5321 that goes through the end surfaces intersecting in the direction substantially orthogonal to the screen body 2, and is circular in cross section for storing therein the latch member 533.

The latch member 533 serves to define the moving position of the second arm section 532 with respect to the first arm section 531. As shown in FIGS. 3A and 3B, this latch member 533 is configured to include a pair of latch member bodies 5331, and a coil spring 5332.

As shown in FIGS. 3A and 3B, the latch member bodies 5331 are similar in shape, and are each a single-piece configuration including a circular plate-like section 5331A, and a latch protrusion section 5331B. The circular plate-like section 5331A is slightly smaller in diameter compared with the latch member storage section 5321. The latch protrusion section 5331B protrudes toward the outside of the surface from the circular plate-like section 5331A to fit in the latch hole 5311A or 5311B. As shown in FIGS. 3A and 3B, the latch member bodies 5331 are both housed in the latch member storage section 5321 in such a manner that their latch protrusion sections 5331B are positioned with a space therebetween.

As shown in FIG. 3B, the coil spring 5332 is housed in the latch member storage section 5321 to be located between a pair of latch member bodies 5331, and biases the latch member bodies 5331 in a direction of moving these away from each other.

With such a configuration, when the second arm section 532 is moved toward/from the first arm section 531, if the latch member 533 housed in the latch member storage section 5321 of the second arm section 532 comes to the position of the latch hole 5311A or 5311B of the first arm section 531, the latch protrusion section 5331B fits in the latch hole 5311A or 5311B, thereby defining the moving position of the second arm section 532 with respect to the first arm section 531.

Herein, the latch member bodies 5331 are being biased by the coil spring 5332, and the tip end portion of the latch protrusion section 5331B is curved. Therefore, even when the latch protrusion section 5331B is fit in the latch hole 5311A or 5311B, with a predetermined level of force applied on the second arm section 532, the second arm section 532 is allowed to move toward/from the first arm section 531.

FIGS. 4 and 5 are each a diagram showing the configuration of the moving member 54, that of the coupling members 55, and that of the biasing member 56.

The moving member 54 is configured by a cylindrical tube member through which the upper-side portion of the column 51 is allowed to be inserted, and as shown in FIG. 4 or 5, moves along the column 51.

As shown in FIG. 2, 4, or 5, the moving member 54 is formed with, on its outer peripheral surface, a second biasing member attachment section 541. This second biasing member attachment section 541 is protruding toward the outside, and is attached with the other end of the biasing member 56, i.e., the end not attached by the first biasing member attachment section 513 (wire 562 that will be described later).

As shown in FIG. 4 or 5, the outer peripheral surface of the moving member 54 is formed with a protrusion section 542 that is protruding toward the outside.

As shown in FIG. 4 or 5, the coupling members 55 are so disposed as to be symmetrical around the column 51, and serve to couple together the moving member 54 and the arm members 53.

Herein, the coupling members 55 share the same configuration, and thus only one of the coupling members 55 is described below.

As shown in FIG. 2, the coupling member 55 is configured by two plate-like members 551A and 551B, which are extending in a predetermined direction.

As shown in FIG. 4 or 5, the two plate-like members 551A and 551B sandwich, between their one ends, the protrusion section 542 of the moving member 54, and in this state, are attached to the protrusion section 542 via a rotation shaft 542A that is substantially orthogonal to the screen body 2. That is, in the coupling member 55, one end is pivotally supported by the moving member 54 to be able to freely rotate about the rotation shaft 542A.

As shown in FIG. 4 or 5, the two plate-like members 551A and 551B also sandwich, between their other ends, the protrusion section 5312 of the first arm section 531, and in this state, are attached to the protrusion section 5312 via a rotation shaft 5312A that is substantially orthogonal to the screen body 2. That is, in the coupling member 55, the other end is pivotally supported by the first arm section 531 to be able to freely rotate about the rotation shaft 5312A.

As shown in FIG. 2, 4, or 5, the biasing member 56 includes the biasing member body 561 (FIGS. 4 and 5), and the wire 562.

The biasing member body 561 is configured by a coil spring, and is disposed inside of the column 51. In the column 51, one end of the biasing member body 561 is attached to the first biasing member attachment section 513 of the column 51, and the other end thereof is connected to one end of the wire 562.

The other end side of the wire 562 is pulled to the outside of the column 51 via the pulley 57 and the through hole 512 formed to the column 51, and then is folded downward from the upper end side of the column 51 for attachment to the second biasing member attachment section 541 of the moving member 54.

With such a configuration, as shown in FIG. 4 or 5, in the biasing member 56, the biasing member body 561 is pulled via the wire 562 when the moving member 54 is moved to the lower side, and by the biasing force of the biasing member body 561, the moving member 54 is biased upward to be away from the joint section 52.

Operation of Image Projection Section

Described next is the operation of the image projection section 1A described above by referring to the accompanying drawings.

Figure 6A:
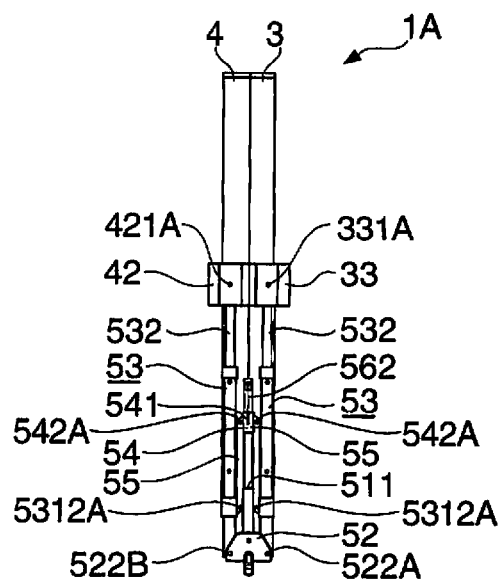
FIGS. 6A to 6C are each a diagram for illustrating the operation of an image projection section in the embodiment.
Figure 6B:
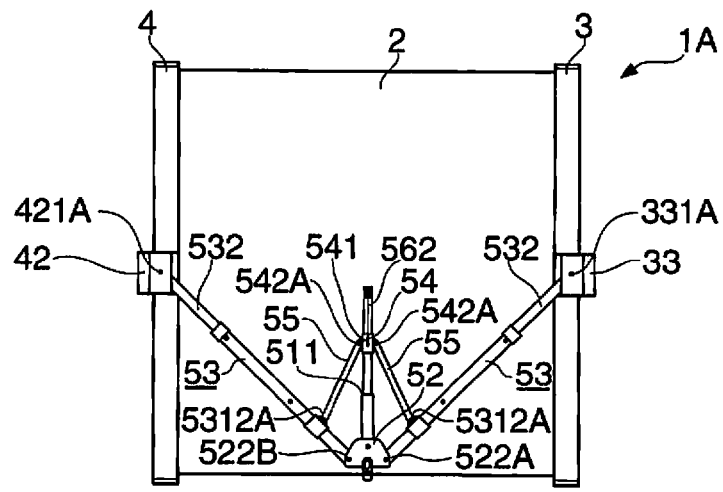
Figure 6C:
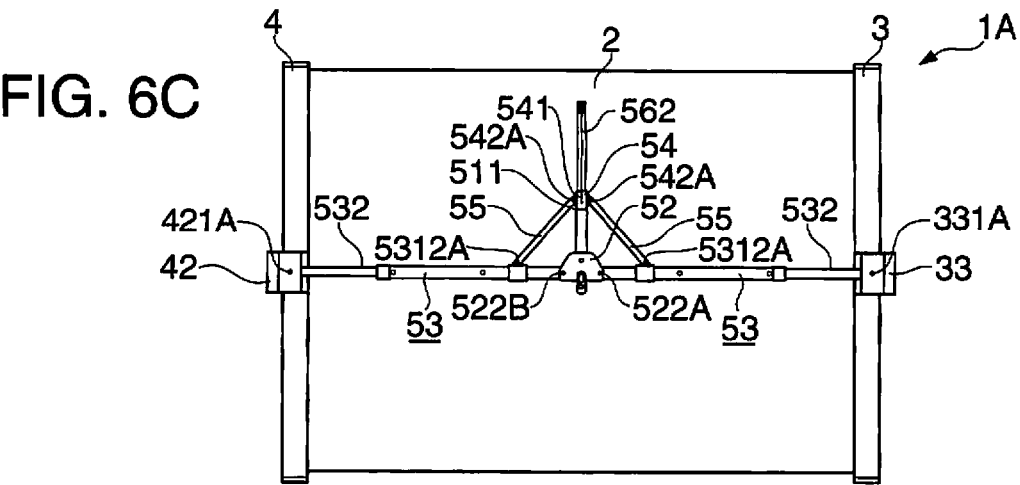
Figure 7:
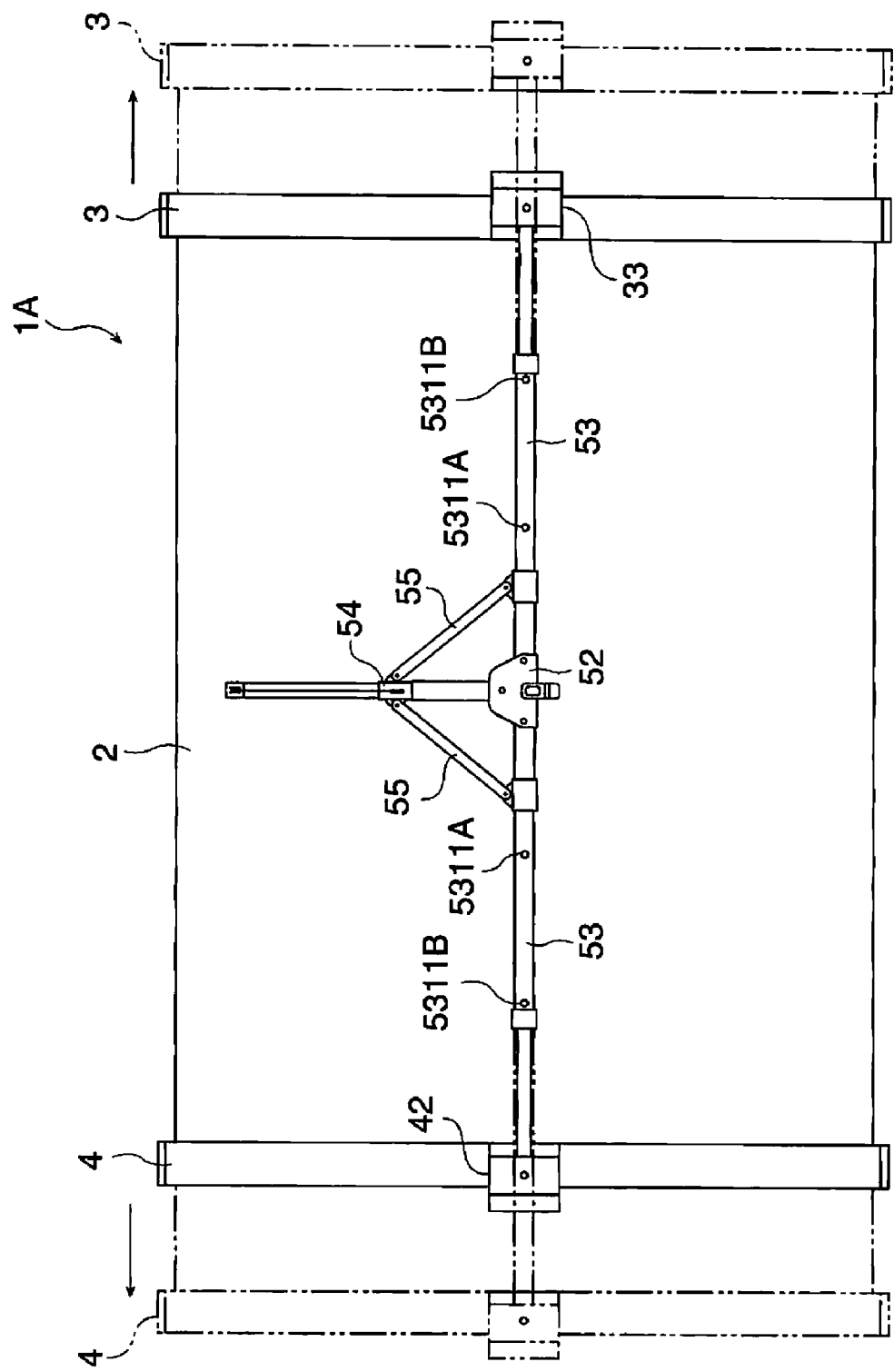
FIG. 7 is another diagram for illustrating the operation of the image projection section in the embodiment.

FIGS. 6A to 6C and 7 are each a diagram for illustrating the operation of the image projection section 1A. Specifically, FIGS. 6A to 6C are diagrams showing in order the state change of the screen body 2, i.e., from the state of storage in which the screen body 2 is wound up by the spring roll 32 to the state of projection surface formation in which the screen body 2 is pulled out. FIG. 7 is a diagram showing, in the state of projection surface formation of FIG. 6C, that the second arm section 532 is moved toward/from the first arm section 531.

A user applies a force in the direction of moving the first and second storage members 3 and 4 away from each other while gripping both the first and second grip sections 33 and 42. As a result, as shown in FIGS. 6A to 6C, the arm members 53 start rotating about the rotation shafts 522A and 522B with respect to the joint section 52 while rotating about the rotation shafts 331A and 421A with respect to the first and second grip sections 33 and 42. Thereafter, the arm members 53 are changed in state, i.e., from an arm-closed state of FIG. 6A in which the second arm sections 532 are close to each other to an arm-open state of FIG. 6C in which the second arm sections 532 are away from each other so that the first and second storage members 3 and 4 are moved away from each other.

At this time, as shown in FIGS. 6A to 6C, in response to the movement of the arm members 53 as such, the coupling members 55 rotate about the rotation shaft 542A with respect to the moving member 54 while rotating about the rotation shaft 5312A with respect to the arm members 53. The coupling members 55 are then changed in state, i.e., from a coupling-closed state of FIG. 6A in which their other ends, i.e., the ends pivotally supported by the first arm section 531, are close to each other to a coupling-open state of FIG. 6C in which their other ends are away from each other.

Moreover, as shown in FIG. 6A to 6C, in response to the movement of the coupling members 55 as such, the moving member 54 is moved downward along the column 51.

After moving downward, the moving member 54 comes in contact with the width-difference section 511 of the column 51 so that the moving member 54 is restricted in movement.

That is, the coupling members 55 and the arm members 53 are all restricted from rotating, and as shown in FIG. 6C, the arm sections 53 are put in the substantially horizontal state. By the first and second storage members 3 and 4 moving away from each other, the screen body 2 is pulled out so that the projection surface is formed. As such, the screen is put in the state of projection surface formation, i.e., image display on the projection surface becomes possible.

Herein, for a state change from the state of 6C, i.e., the state of projection surface formation, to the state of FIG. 6A, the image projection section 1A operates in reverse order from the order described above.

In the state of projection surface formation of FIG. 6C, when the latch protrusion section 5331B is being fit in the latch hole 5311A, the projection surface of the screen body 2 has the aspect ratio of "4:3" as indicated by the solid lines in FIG. 7. In the state that the second arm section 532 is being pulled out from the first arm section 531, and when the latch protrusion section 5331B is being fit in the latch hole 5311B, the projection surface of the screen body 2 has the aspect ratio of "16:9" as indicated by the chain double-dashed lines in FIG. 7.

That is, the latch holes 5311A and 5311B are respectively formed at the positions where the aspect ratios are "4:3" and "16:9" on the projection surface.

Configuration of Support Leg

Figure 8:
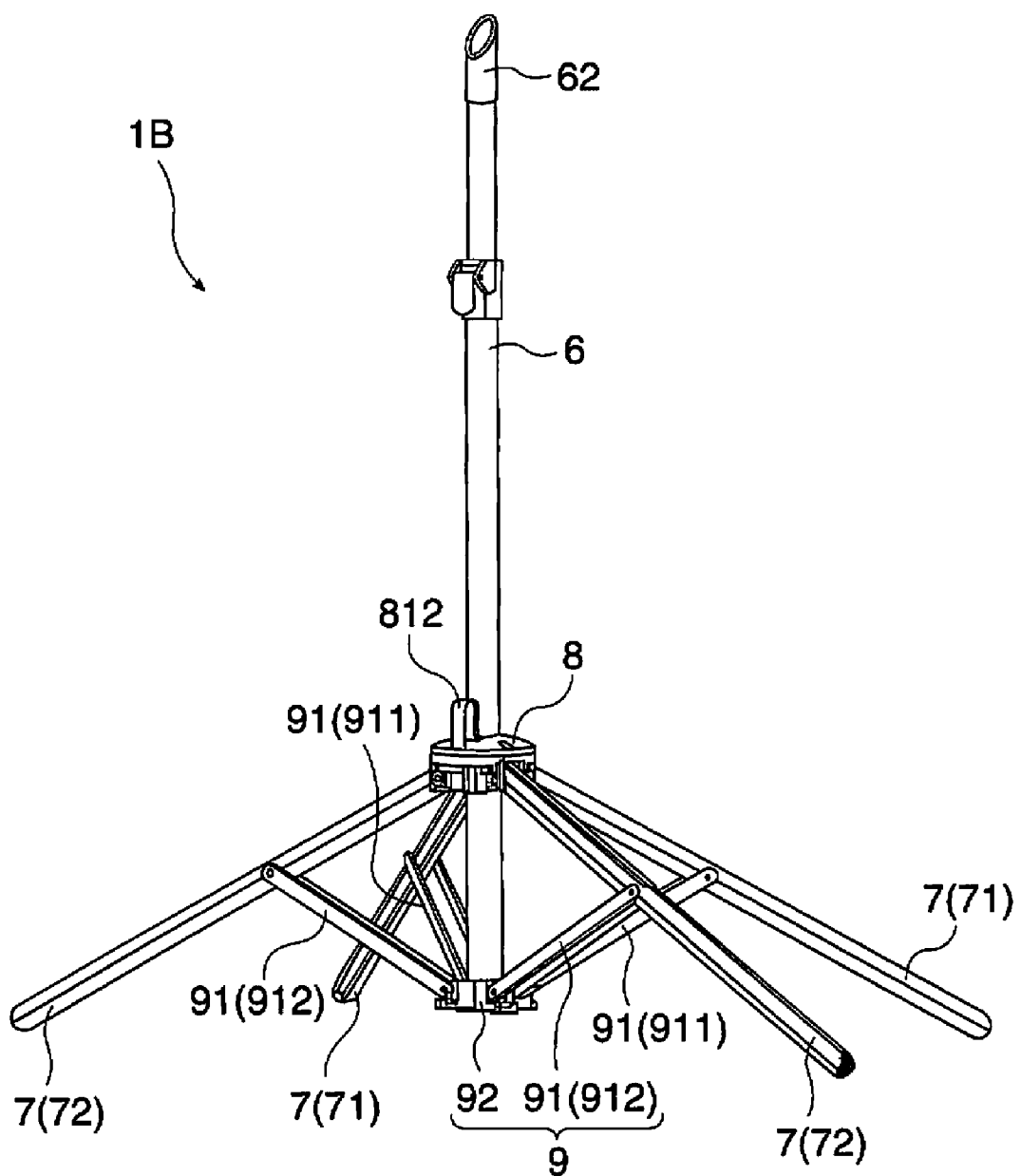
FIG. 8 is a perspective view of a support leg in the embodiment, showing the schematic configuration thereof.

FIG. 8 is a perspective view of the support leg 1B, showing the schematic configuration thereof. Specifically, FIG. 8 is a perspective view of the support leg 1B viewed from the rear surface side of the screen 1.

The support leg 1B is a portion that supports the image projection section 1A, and as shown in FIG. 8, is configured to include a support leg body 6, four leg sections 7, a connection member 8, and a state restriction member 9.

As shown in FIG. 8, the support leg body 6 is a member shaped substantially like a cylinder extending in the vertical direction.

This support leg body 6 is shaped with a width difference, i.e., the lower-side portion thereof is larger in diameter than the upper-side portion thereof, and a width-difference section 61 (refer to FIG. 12) is provided.

In this support leg body 6, as shown in FIG. 8, the upper-side end portion is provided with an attachment/detachment section 62, which is configured by a substantially cylindrical tube member, and is fit with the lower end portion of the column 51. When the lower end portion of the column 51 is fit to the attachment/detachment section 62, the column 51 and the support leg body 6 are connected so that the image projection section 1A is supported by and fixed to the support leg 1B.

As shown in FIG. 8, the four leg sections 7 are each configured by a pillar-like member extending in a predetermined direction, and support upright the support leg body 6 by their one ends abutting the placement surface such as floor surface, and by their other ends being connected to the connection member 8.

Although specific details will be given later, the four leg sections 7 are so configured as to be changed in state due to the connection structure between their other ends and the connection member 8, i.e., a leg-open state in which their one ends are located away from a pillar-like shaft of the support leg body 6 (in-use state; state of FIGS. 8 and 9), and a leg-closed state in which their one ends are located close to the pillar-like shaft (not-in-use state; state of FIGS. 12 and 13).

Although specific details will be given later, out of the four leg sections 7 due to the connection structure between their other ends and the connection member 8, two are disposed on the front surface side of the screen 1, and are changed in state only between the leg-open state and the leg-closed state, i.e., front-surface-side leg sections 71. The remaining two are disposed on the rear surface side of the screen 1, and are also changed in state between the leg-open state and the leg-closed state, i.e., rear-surface-side leg sections 72. When these rear-surface-side leg sections 72 are in the leg-open state, the angle can be changed with any other leg section 7 adjacent thereto in the direction of rotating about the pillar-like shaft of the support leg body 6.

Figure 9:
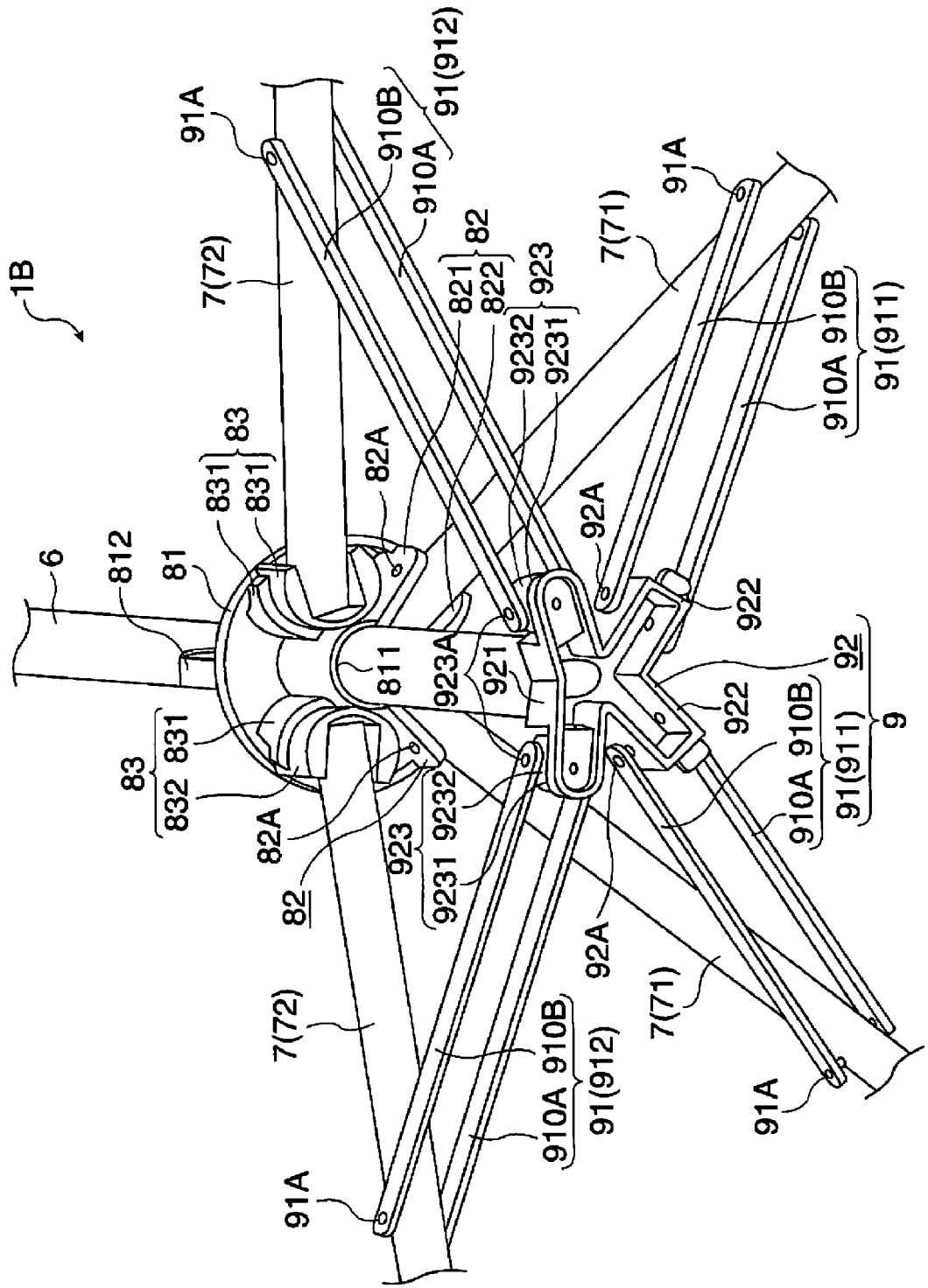
FIG. 9 is a perspective view of the support leg of FIG. 8, viewed from below.

FIG. 9 is a perspective view of the support leg 1B of FIG. 8 viewed from below.

The connection member 8 moves along the support leg body 6 while being connected with the four leg sections 7. As shown in FIG. 9, this connection member 8 is configured to include a connection member body 81, two front-surface-side first pivotal support sections 82, and two rear-surface-side first pivotal support sections 83.

As shown in FIG. 9, the connection member body 81 is shaped substantially like a disc formed with, at substantially the center portion, an insertion hole 811 for insertion of the upper-side portion of the support leg body 6.

As shown in FIG. 8 or 9, in the connection member body 81, the upper end surface is formed with a handle 812 protruding upward for a user to grip to carry around the support leg 1B.

The two front-surface-side first pivotal support sections 82 are formed on the lower end surface of the connection member body 81 on the front surface side of the screen 1, and pivotally support the other ends of the two front-surface-side leg sections 71, i.e., the ends connected to the connection member 8, to allow their state change between the leg-open state and the leg-closed state.

Herein, the two front-surface-side first pivotal support sections 82 are similar in shape, and thus only one of the front-surface-side first pivotal support sections 82 is described below.

As shown in FIG. 9, the front-surface-side first pivotal support section 82 is configured to include a pair of plate-like sections 821 and 822 protruding downward from the lower end surface of the connection member body 81. The front-surface-side first pivotal support section 82 pivotally supports the front-surface-side leg section 71 about a first rotation shaft 82A while sandwiching the other end of the front-surface-side leg section 71, i.e., the end connected to the connection member 8, to allow its state change between the leg-open state and the leg-closed state.

Figure 10:
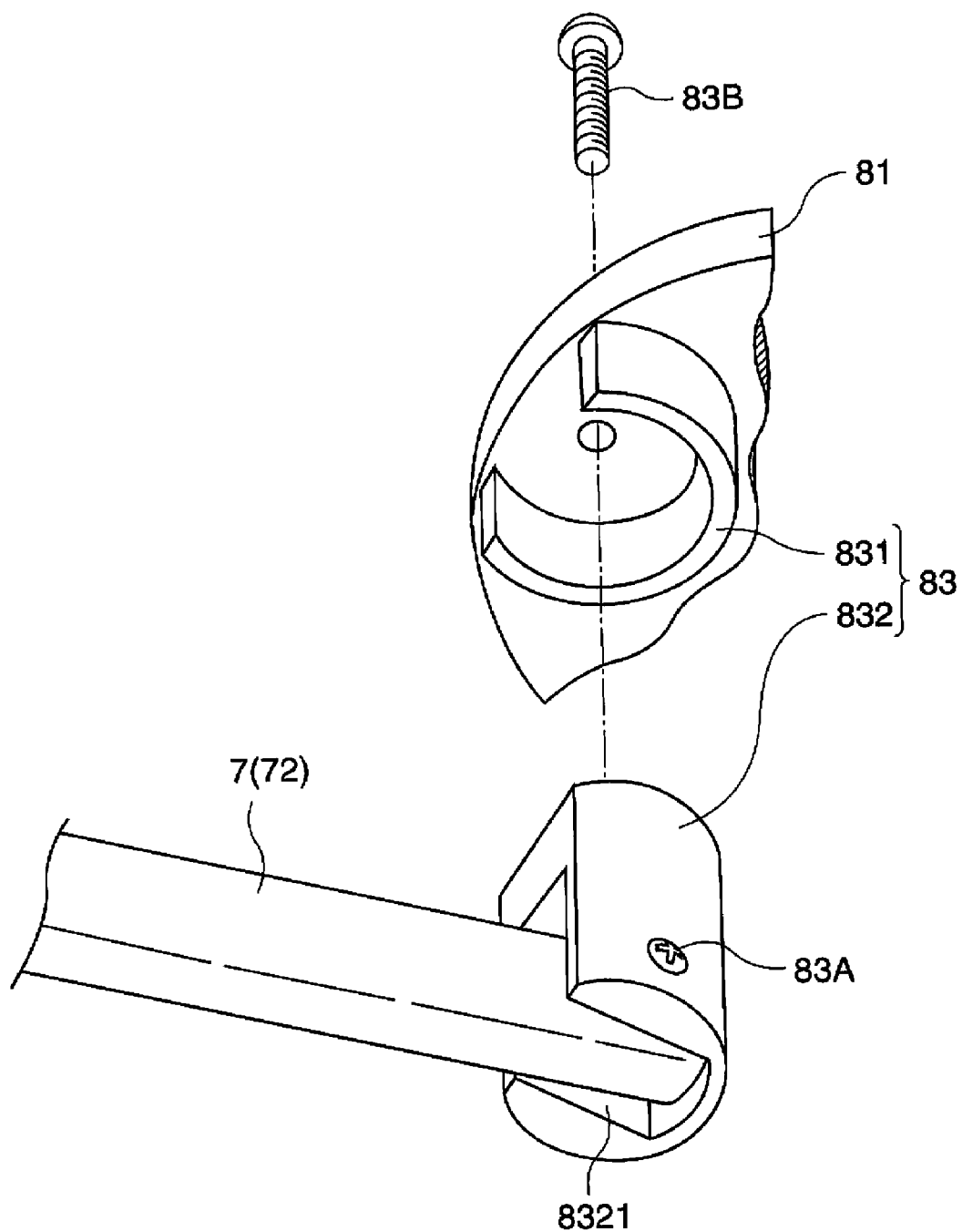
FIG. 10 is an exploded perspective view of a rear-surface-side first pivotal support section in the embodiment, showing the configuration thereof.

FIG. 10 is an exploded perspective view of the rear-surface-side first pivotal support section 83, showing the configuration thereof.

The two rear-surface-side first pivotal support sections 83 respectively support pivotally the other ends of the two rear-surface-side leg sections 72, i.e., the ends connected to the connection member 8. As shown in FIG. 9 or 10, the rear-surface-side first pivotal support sections 83 are each configured to include a rotation guide section 831, and a first rotation shaft support section 832.

Herein, the two rear-surface-side first pivotal support sections 83 are similar in shape, and thus only one of the rear-surface-side first pivotal support sections 83 is described below.

As shown in FIG. 9 or 10, the rotation guide section 831 is formed on the lower end surface of the connection member body 81 on the rear surface side of the screen 1, and guides the first rotation shaft support section 832 to rotate.

To be specific, as shown in FIG. 10, the rotation guide section 831 protrudes downward from the lower end surface of the connection member body 81, and is shaped like an arc in planar view, i.e., viewed from below, about a vertical shaft corresponding to the outer shape of the first rotation shaft support section 832. The rotation guide section 831 is then fit with the first rotation shaft support section 832, thereby guiding the first rotation shaft support section 832 to rotate.

As shown in FIG. 10, the first rotation shaft support section 832 is configured by a substantially cylindrical member extending in the vertical direction.

This first rotation shaft support section 832 is formed with, at its lower end portion, as shown in FIG. 10, a concave section 8321 for insertion of the other end of the rear-surface-side leg section 72, i.e., the end connected with the connection member 8.

As shown in FIG. 10, for a state change between the leg-open state and the leg-closed state, the first rotation shaft support section 832 pivotally supports the rear-surface-side leg section 72 via a screw 83A, i.e., first rotation shaft, in the state that the concave section 8321 is inserted with the other end of the rear-surface-side leg section 72, i.e., the end connected to the connection member 8.

As shown in FIG. 10, the first rotation shaft support section 832 is attached to the connection member body 81 via a screw 83B, i.e., rotation shaft, from above of the connection member body 81 while being fit to the rotation guide section 831. That is, while being attached to the connection member body 81, the first rotation shaft support section 832 rotates the rear-surface-side leg section 72 about the first rotation shaft 83A for a state change thereof, i.e., between the leg-open state and the leg-closed state. In the leg-open state, the first rotation shaft support section 832 is rotated together with the rear-surface-side leg section 72 about the rotation shaft 83B, i.e., vertical shaft, thereby changing the angle with any other leg section 7 adjacent thereto in the direction of rotating about the pillar-like shaft of the support leg body 6.

When the four leg sections 7 are in the leg-open state, i.e., state of FIG. 8 or 9, the state restriction member 9 serves to restrict the one ends thereof, i.e., the ends abutting the placement surface, not to move away from the pillar-like shaft of the support leg body 6, and to make the four leg sections 7 remain in the leg-open state. As shown in FIG. 8 or 9, this state restriction member 9 is configured to include four placement members 91, and a fixing member 92.

As shown in FIG. 8 or 9, the four placement members 91 are respectively placed across the four leg sections 7 and the fixing member 92.

Herein, these four placement members 91 are similar in shape, and thus only one of the placement members 91 is described below.

As shown in FIG. 9, the placement member 91 is configured by two rod-like members 910A and 910B extending in a predetermined direction.

As shown in FIG. 9, the two rod-like members 910A and 910B sandwich the leg section 7 between their one ends, and in this state, are attached to the leg section 7 via a second rotation shaft 91A, which is parallel to the first rotation shafts 82A and 83A through which thus sandwiched leg section is connected to the connection member 8. That is, one end of the placement member 91 is pivotally supported by the leg section 7 to be able to freely rotate about the second rotation shaft 91A.

In the below, for convenience, among the four placement members 91, two placement members attached to the front-surface-side leg sections 71 are referred to as front-surface-side placement members 911, and two placement members attached to the rear-surface-side leg sections 72 are referred to as rear-surface-side placement members 912.

The fixing member 92 serves to support the four placement members 91. As shown in FIG. 9, this fixing member 92 is configured to include a fixing member body 921, two front-surface-side second pivotal support sections 922, and two rear-surface-side second pivotal support sections 923.

As shown in FIG. 9, the fixing member body 921 is substantially orthogonal to the vertical shaft from the center position, and is shaped substantially like a cross in planar view by protruding in four directions. The center position of the fixing member body 921 is fixed to the lower end portion of the support leg body 6.

As shown in FIG. 9, the two front-surface-side second pivotal support sections 922 are two protruding sections of the fixing member body 921 protruding toward the front surface side of the screen 1. While being sandwiched by the other ends of the rod-like members 910A and 910B, i.e., the ends not sandwiching the leg section 7, the front-surface-side second pivotal support sections 922 pivotally support the other ends of the two front-surface-side placement members 911, i.e., the ends not pivotally supported about the second rotation shaft 91A, about a third rotation shaft 92A, which is parallel to the second rotation shaft 91A through which the front-surface-side placement members 911 are connected to the front-surface-side leg sections 71.

Figure 11:
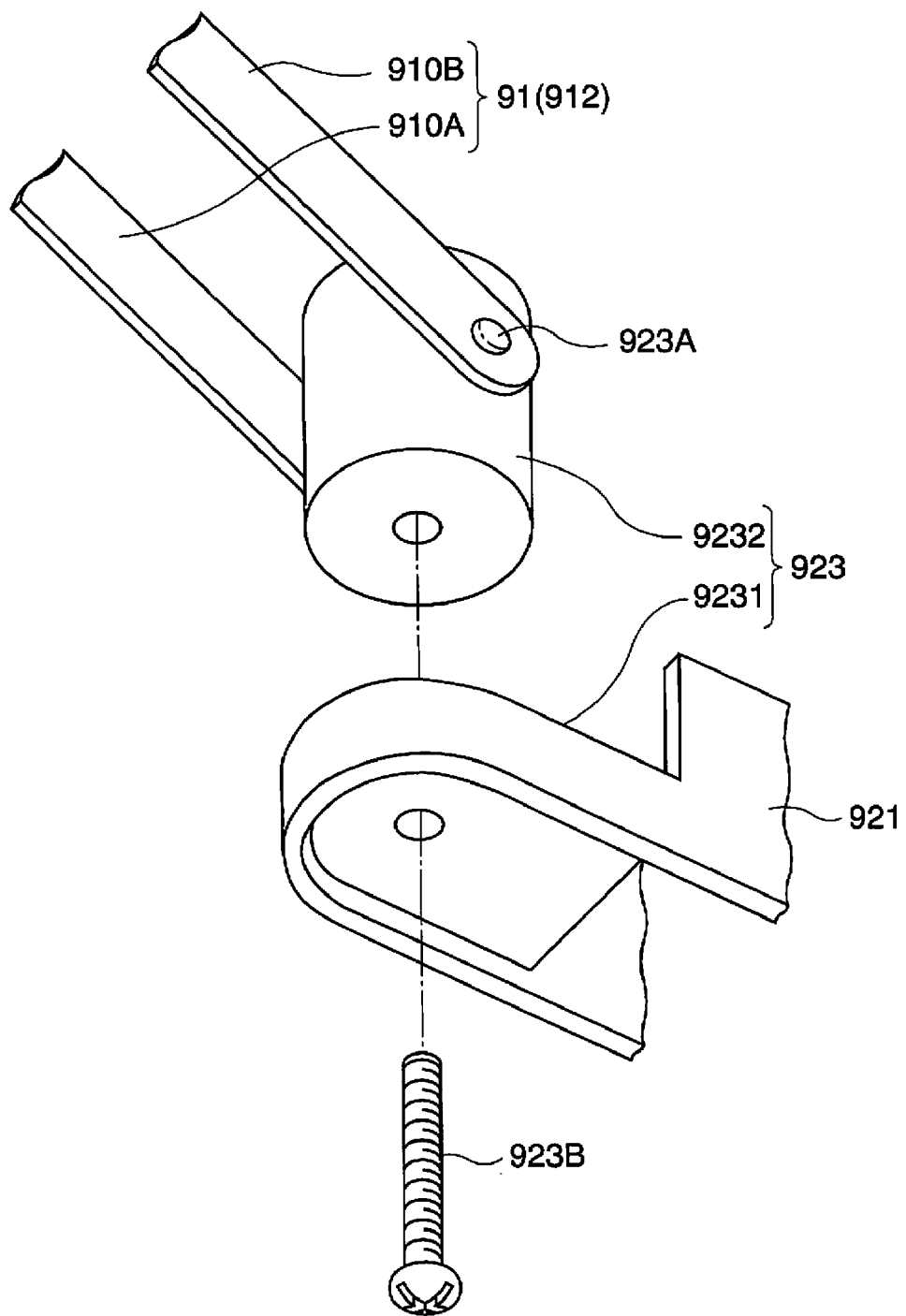
FIG. 11 is an exploded perspective view of a rear-surface-side second pivotal support section in the embodiment, showing the configuration thereof.

FIG. 11 is an exploded perspective view of the rear-surface-side second pivotal support section 923, showing the configuration thereof.

As shown in FIG. 9, the two rear-surface-side second pivotal support sections 923 are provided to the two protruding sections of the fixing member body 921 protruding toward the rear surface side of the screen 1. These two rear-surface-side second pivotal support sections 923 respectively pivotally support the other ends of the two rear-surface-side placement members 912, i.e., the ends not pivotally supported about the second rotation shaft 91A. As shown in FIG. 9 or 11, the rear-surface-side second pivotal support sections 923 are each configured to include a rotation bearing section 9231, and a second rotation shaft support section 9232.

Herein, these two rear-surface-side second pivotal support sections 923 are similar in shape, and thus only one of the rear-surface-side second pivotal support sections 923 is described below.

As shown in FIG. 11, the rotation bearing section 9231 is shaped like a concave, i.e., recessed downward, at the tip end portions of the protruding sections of the fixing member body 921 protruding toward the rear surface side of the screen 1, and supports the second rotation shaft support section 9232 at the bottom portion thereof.

As shown in FIG. 11, the second rotation shaft support section 9232 is configured by a substantially cylindrical member extending in the vertical direction.

As shown in FIG. 11, the second rotation shaft support section 9232 is sandwiched between the ends of the rod-like members 910A and 910B, i.e., the ends not sandwiching the leg section 7, and in this state, pivotally supports the other ends of the rear-surface-side placement members 912, i.e., the ends not pivotally supported about the second rotation shaft 91A, about a third rotation shaft 923A, which is parallel to the second rotation shaft 91A through which the rear-surface-side placement members 912 are connected to the rear-surface-side leg sections 72.

As shown in FIG. 11, the second rotation shaft support section 9232 is supported by the rotation bearing section 9231, and in this state, is attached to the fixing member body 921 via a screw 923B, i.e., rotation shaft, from the lower side of the fixing member body 921. That is, the second rotation shaft support section 9232 is allowed to rotate together with the rear-surface-side placement members 912 about a rotation shaft 923B, i.e., vertical shaft.

Operation of Support Leg

Figure 12:
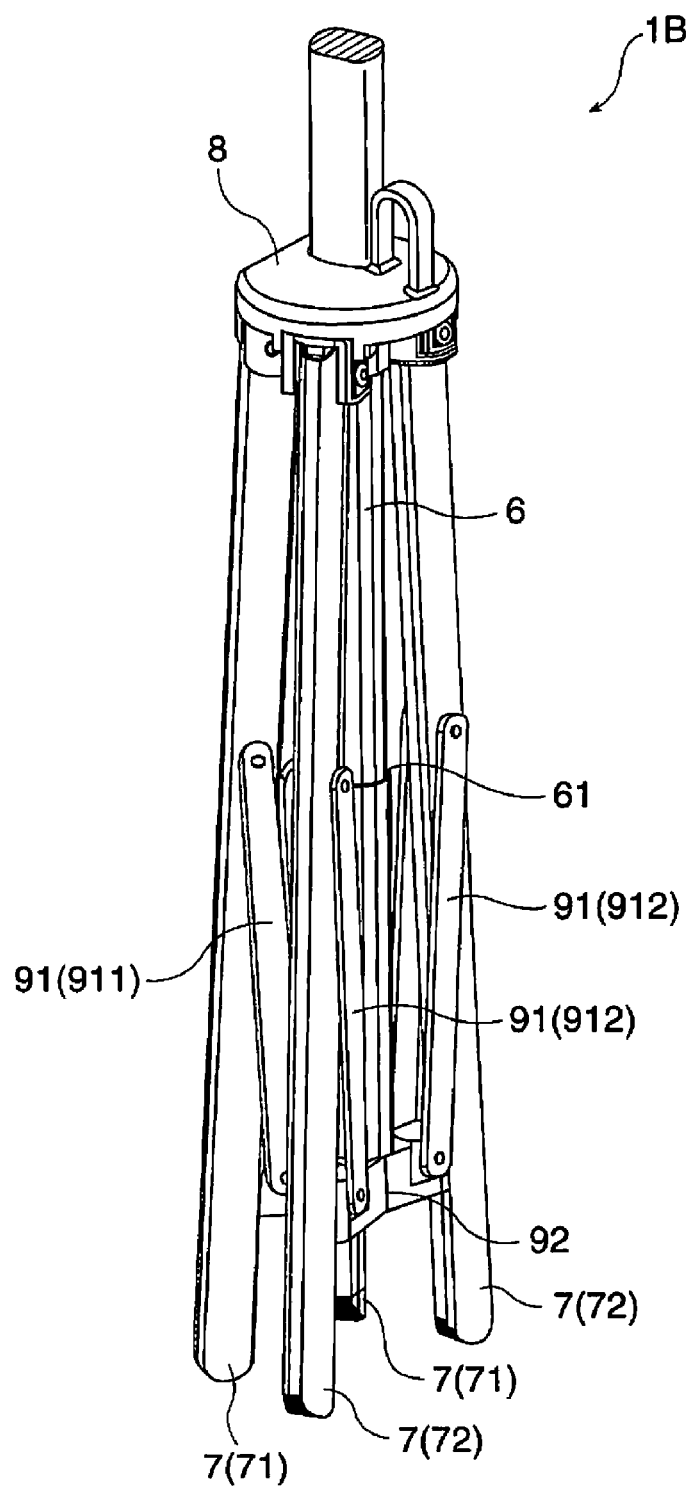
FIG. 12 is a diagram for illustrating the operation of the support leg in the embodiment.

FIG. 12 is a diagram for illustrating the operation of the support leg 1B. Specifically, FIG. 12 is a perspective view of the four leg sections 7 after a state change to the leg-closed state.

By referring to FIGS. 8, 9, and 12, described next is the operation of the support leg 1B.

In the leg-closed state of FIG. 12, when a user applies a force to the four leg sections 7 in a direction of moving one ends thereof away from the pillar-like shaft of the support leg body 6, the leg sections 7 start rotating about the first rotation shafts 82A and 83A with respect to the connection member 8.

At this time, in response to the movement of the leg sections 7 as such, the four placement members 91 start rotating about the third rotation shafts 92A and 923A with respect to the fixing member 92 while rotating about the second rotation shaft 91A with respect to the leg sections 7. As a result, the leg sections 7, i.e., connection member 8, are pulled downward along the support leg body 6.

After being moved downward, when the connection member 8 comes in contact with the width-difference section 61 of the support leg body 6, the connection member 8 is restricted in movement, and as shown in FIG. 8 or 9, the four leg sections 7 are changed in state, i.e., the leg-open state. In this state, because the four leg sections 7 are placed, by the placement members 91, to the fixing member 92 fixed to the support leg body 6, the four leg sections 7 are restricted to a further degree in movement, i.e., their one ends in the leg-open state are restricted not to move away from the pillar-like shaft of the support leg body 6.

In the leg-open state of FIG. 8 or 9, when the user applies a force to the two rear-surface-side leg sections 72 in a direction of rotating about the pillar-like shaft of the support leg body 6, the rear-surface-side leg sections 72 start rotating together with the first rotation shaft support sections 832 about the rotation shaft 83B.

At this time, in response to the rotation of the rear-surface-side leg sections 72 as such, the two rear-surface-side placement members 912 start rotating together with the second rotation shaft support sections 9232 about the rotation shaft 923B.

This thus changes the angle between any two leg sections 7 in the direction of rotating about the pillar-like shaft of the support leg body 6.

Figure 13:
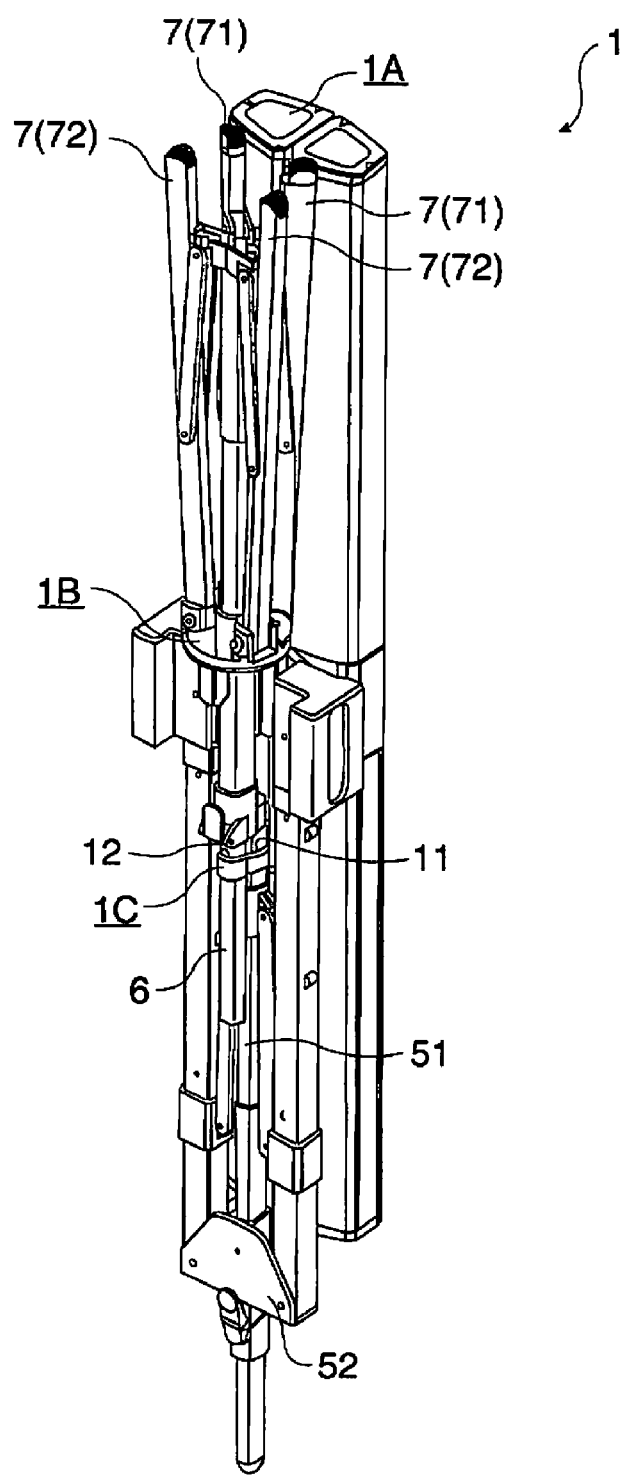
FIG. 13 is a diagram showing the schematic configuration of a binding member in the embodiment.

FIG. 13 is a diagram showing the schematic configuration of the binding member 1C.

As shown in FIG. 13, the binding member 1C is a single-piece configuration including first and second tubular sections 11 and 12. The first tubular section 11 is so configured as to be inserted with the upper-side portion of the column 51, and the second tubular section 12 is so configured as to be inserted with the upper-side portion of the support leg body 6.

When the screen 1 is not in use, first of all, as shown in FIG. 13, the image projection section 1A is put in the state of storage. For the purpose, the first tubular section 11 is inserted with the upper-side portion of the column 51, thereby attaching the binding member 1C to the image projection section 1A. Thereafter, as shown in FIG. 13, the support leg 1B is changed in state to the leg-closed state. Also as shown in FIG. 13, in the state that the upper-side portion of the support leg body 6 is proximal to the joint section 52, and in the state that the leg sections 7 are all away from the joint section 52, the upper-side portion of the support leg body 6 is inserted into the second tubular section 12 of the binding member 1C.

As such, when the screen 1 is not in use, the binding member 1C binds together as a piece the column 51 and the support leg body 6 stacked one on the other so that the image projection section 1A and the support leg 1B are combined together.

The embodiment described above can lead to the following effects.

In the above embodiment, the screen 1 is provided with the column 51, a pair of arm members 53, and the retention member 5 for holding both the first and second storage members 3 and 4. In the arm members 53, an end portion of each of the second arm sections 532 are respectively supported pivotally by the first and second storage members 3 and 4 about the rotation shafts 331A and 421A, and an end portion of each of the first arm sections 531 are respectively supported pivotally by the column 51, i.e., joint section 52, about the rotation shafts 522A and 522B. With such a configuration, in the state of storage, the arm members 53 can be so set that the second arm sections 532 are positioned close to each other, and can be so set as to be substantially parallel to the pillar-like shaft, i.e., vertical shaft, of the column 51. Also in the state of storage, rotating the arm members 53 with respect to the column 51 in such a manner that their second arm sections 532 are moved away from each other can make a state change, i.e., to the state of projection surface formation. That is, by rotating the arm members 53 as such, the first and second storage members 3 and 4 respectively supporting pivotally the second arm members 532 are moved away from each other while remaining parallel to each other. Similarly, in the state of projection surface formation, rotating the arm members 53 with respect to the column 51 in such a manner that their second arm sections 532 are moved close to each other can lead to another state change, i.e., to the state of storage. That is, by rotating the arm members 53 as such, the first and second storage members 3 and 4 respectively supporting pivotally their second arm sections 532 are moved close to each other while remaining parallel to each other so that the state is changed to be ready for storage.

As such, only by rotating the arm members 53 with respect to the column 51, the state of the image projection section 1A can be changed between storage and projection surface formation, thereby implementing the configuration with good usability. Moreover, compared with the previous configuration, only the column 51 and a pair of arm members 53 can move the first and second storage members 3 and 4 close to or away from each other, thereby implementing the simple configuration.

The retention member 5 is provided with the moving member 54 and a pair of coupling members 55. The coupling members 55 serve to move the moving member 54 along the column 51 in response to the rotation of the arm members 53 with respect to the column 51. In this configuration, because a pair of coupling members 55 respectively coupled to a pair of arm members 53 are all coupled to the same moving member 54, for a state setting of either storage or projection surface formation, by the workings of the coupling members 55 and the moving member 54, rotating one of the arm members 53 with respect to the column 51 can rotate also the remaining arm member 53 with respect to the column 51. Accordingly, the above-described effects of being able to implement the configuration with good usability can be achieved in a suitable manner.

The retention member 5 is provided with the biasing member 56 that biases upward the moving member 54. With the biasing member provided as such, for a state setting of the image projection section 1A from projection surface formation to storage, a user does not need that much of a force to rotate the arm members 53 but the biasing force of the biasing member body 561 will do with respect to the column 51 in such a manner that the second arm section 532 are moved close to each other. As an alternative configuration, for a state setting of the image projection section 1A from storage to projection surface formation, the biasing force of the biasing member body 561 can prevent the arm members 53 from abruptly rotating due to the self weight of the components, i.e., the first and second storage members 3 and 4, and the arm members 53, thereby helping a user to rotate smoothly the arm members 53. Accordingly, the above-described effects of being able to implement the configuration with good usability can be achieved in a suitable manner.

The arm members 53 are each provided with the first arm section 531 and the second arm section 532, and the second arm section 532 is freely moved toward/from the first arm section 531. With such a configuration, when the image projection section 1A is in the state of projection surface formation, by moving the second arm section 532 toward/from the first arm section 531, the space dimension can be changed between the first and second storage members 3 and 4, thereby changing as appropriate the aspect ratio of the projection surface in accordance with the aspect ratio of images to be projected.

In this configuration, the arm members 53 are each provided with the latch member 533. Accordingly, for moving the second arm section 532 toward/from the first arm section 531, the user can clearly know the position where the projection surface has the aspect ratio of "4:3" or "16:9".

Moreover, when the image projection section 1A is in the state of storage, moving the second arm section 532 toward the inside of the first arm section 531 will reduce the size of the image projection section 1A, and thus the resulting image projection section 1A can be carried around with ease.

The first and second storage members 3 and 4 respectively support end portions of the screen body 2 in the lateral direction. In the state of storage, in the arm members 53, their second arm sections 532 are both positioned on the upper side. With such a configuration, for a state setting of the image projection section 1A from storage to projection surface formation, utilizing the self weight of the components, i.e., the screen body 2, the first and second storage members 3 and 4, and the arm members 53, the user does not need that much of a force to rotate the arm members 53 with respect to the column 51 in such a manner that the second arm sections 532 are moved away from each other. Accordingly, the above-described effects of being able to implement the configuration with good usability can be achieved in a suitable manner.

The screen 1 is provided with the support leg 1B including four leg sections 7. This configuration enables the screen 1 to remain stably positioned by the four leg sections 7 each abutting the placement surface.

Herein, the support leg 1B is configured to be attachable/detachable to/from the image projection section 1A. As such, when the screen 1 is not in use, removing the support leg 1B from the image projection section 1A can reduce the entire length of the screen 1 so that the screen 1 can be carried around with ease.

The support leg 1B is provided with the support leg body 6 shaped substantially like a pillar, and an end of each of the four leg sections 7 is pivotally supported to be close to or away from a pillar-like shaft of the support leg body 6, and the other end of each of these leg sections 7 is pivotally supported by the support leg body 6, i.e., connection member 8, about the first rotation shafts 82A and 83A. With such a configuration, for using the screen 1, the support leg 1B is set in the leg-open state, and when the screen 1 is not in use, the support leg 1B is set in the leg-closed state. Moreover, the screen 1 is provided with the binding member 1C. Therefore, when the screen 1 is not in use, in the state that the image projection section 1A is set in the state of storage, and in the state that the support leg 1B is set in the leg-closed state, the column 51 and the support leg body 6 are bound as a piece by the binding member 1C. Accordingly, the screen 1 can be reduced in size when it is not in use, and the resulting screen 1 can be carried around with ease.

While the embodiments of the disclosure have been described in detail, the foregoing description is in all aspects illustrative and not restrictive. It is understood that numerous other modifications and variations can be devised without departing from the scope of the disclosure.

In the above embodiment, the first and second storage members 3 and 4 are so configured as to respectively support the end portions of the screen body 2 in the lateral direction, and move to close to or away from each other in the horizontal direction. This is surely not restrictive, and alternatively, the first and second storage members may respectively support the end portions of the screen body 2 in the vertical direction, and move to close to or away from each other in the vertical direction.

In the above embodiment, the spring roll 32 is provided only to the first storage member 3. This is surely not the only option, and the spring roll 32 may be provided also to the second storage member 4, and both the first and second storage members 3 and 4 may wind up the screen body 2.

The screen of the disclosure is simple in configuration, and has good operational usability, and thus can serve well for projection of image lights magnified and projected by a projector or others.

This application is intended to cover any adaptations or variations of the embodiments discussed herein. Therefore, it is manifestly intended that embodiments in accordance with the present disclosure be limited only by the claims and the equivalents thereof.

What is claimed is:

1. A screen comprising:
a flexible screen body onto which an image light is projected;
a first storage member including a screen wind-up section configured to support either end portion of the screen body and to wind-up the screen body and a base body configured to support the screen wind-up section;
a second storage member configured to support the other end portion; and
a retention member configured to hold both the first and second storage members, the retention member including a column and a pair of arm members, the column extending along the screen body in a direction that is substantially orthogonal to where the first and second storage members are opposing each other, the pair of arm members being configured to couple together the column and the first and second storage members, and one end of each of the arm members being respectively configured to rotatably couple to the first and second storage members and the other end of each of the arm members being configured to rotatably couple to the column, wherein:
the retention member includes a moving member surrounding an outer portion of the column, the moving member being configured to move along the column, the retention member includes a pair of coupling members whose ends are rotatably coupled to the moving member and whose other ends are respectively rotatably coupled to the arm members, and the column has a width-difference section configured to restrict movement of the moving member along the column.

2. The screen according to claim 1, wherein the retention member includes a biasing member, connected to the moving member and the column, configured to bias the moving member in a direction along which the moving member is moved when the arm members are rotated with respect to the column such that the one ends of each of the arm members are brought closer to each other.

3. The screen according to claim 1, wherein the arm members each include a tubular member that extends in a predetermined direction and an insertion member, formed like a pillar extending in the predetermined direction, inserted into the tubular member configured to freely move in the direction along which the tubular member is extended.

4. The screen according to claim 1, wherein the first and second storage members respectively support end portions orthogonal to the horizontal direction of the screen body and when the first and second storage members are positioned close to each other, the one ends of the arm members, rotatably coupled to the first and second storage members, are located on an upper side.

5. The screen according to claim 1, further comprising a support leg, detachably attached to the column, including a plurality of leg sections abutting a placement surface where the screen is disposed and configured to support the screen in its entirety through connection to the column.

6. The screen according to claim 5, wherein the support leg includes a substantially pillar shaped support leg body with an attachment/detachment section configured to allow detachable attachment to the column, one end of each of the plurality of leg sections abutting the placement surface being attached to either be close to or away from a pillar-like shaft of the support leg body, and the other end of each of the plurality of leg sections being rotatably attached to the support leg body, and a binding member being configured to bind the column and the support leg body together as a piece, stacked one on the other, when the support leg is removed from the column for storage of the screen.

* * * * *